(12) United States Patent
Yoo et al.

(10) Patent No.: US 7,742,100 B2
(45) Date of Patent: *Jun. 22, 2010

(54) PORTABLE TERMINAL HAVING DIGITAL CAMERA FUNCTION

(75) Inventors: Young-Hoon Yoo, Seoul (KR); Ju-Young Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 513 days.

This patent is subject to a terminal disclaimer.

(21) Appl. No.: 11/640,333

(22) Filed: Dec. 18, 2006

(65) Prior Publication Data

US 2007/0097248 A1 May 3, 2007

Related U.S. Application Data

(63) Continuation of application No. 11/016,739, filed on Dec. 21, 2004, now Pat. No. 7,451,608.

(51) Int. Cl.
*H04N 5/225* (2006.01)
*H04M 1/00* (2006.01)

(52) U.S. Cl. .................................. 348/373; 455/575.1

(58) Field of Classification Search ................. 348/373, 348/207.99; 455/90, 556.1, 575.1, 575.3, 455/575.4
See application file for complete search history.

(56) References Cited

U.S. PATENT DOCUMENTS

| | | | |
|---|---|---|---|
| 4,543,609 A | | 9/1985 | Smith |
| 6,295,088 B1 * | | 9/2001 | Tsukahara et al. ...... 348/333.06 |
| 6,822,871 B2 * | | 11/2004 | Lee et al. .................... 361/727 |
| 2002/0019216 A1 * | | 2/2002 | Horiguchi .................... 455/90 |
| 2002/0160724 A1 * | | 10/2002 | Arai et al. .................... 455/90 |
| 2003/0064685 A1 * | | 4/2003 | Kim ............................ 455/90 |
| 2003/0162509 A1 | | 8/2003 | Bae et al. |
| 2003/0211874 A1 | | 11/2003 | Mizuta et al. |
| 2004/0141084 A1 | | 7/2004 | Kurakata |

(Continued)

FOREIGN PATENT DOCUMENTS

JP    6-26011    4/1994

(Continued)

OTHER PUBLICATIONS

Japanese Search Report dated Oct. 16, 2007 (with English translation).

(Continued)

*Primary Examiner*—David L Ometz
*Assistant Examiner*—Akshay Trehan
(74) *Attorney, Agent, or Firm*—KED & Associates, LLP (57) ABSTRACT

A portable terminal is provided having a digital camera function that includes a display main body having a display, a camera assembly having a camera module for focusing on a subject and photographing an image of the subject displayed on the display and a turning unit to rotatably couple the display main body to the camera assembly. A terminal main body may have an information processing function and may being movably mounted on the display main body. A speaker unit and a mike unit may transmit or receive voice information. The portable terminal may have the digital camera function and allow the user to perform voice communication and easily photograph a still image or dynamic image of a subject. This may improve the structural intensity in photographing.

45 Claims, 9 Drawing Sheets

U.S. PATENT DOCUMENTS

| | | | |
|---|---|---|---|
| 2004/0180703 A1 | 9/2004 | Kim et al. | |
| 2004/0192220 A1* | 9/2004 | Huang et al. | 455/74 |
| 2004/0198474 A1 | 10/2004 | Jung et al. | |
| 2004/0198477 A1 | 10/2004 | Jung et al. | |
| 2004/0204194 A1 | 10/2004 | Akai et al. | |
| 2005/0037821 A1 | 2/2005 | Takagi | |
| 2006/0105806 A1 | 5/2006 | Vance et al. | 455/556.1 |

FOREIGN PATENT DOCUMENTS

| | | |
|---|---|---|
| JP | 8-294030 | 11/1996 |
| JP | 09-130489 | 5/1997 |
| JP | 10-070485 | 3/1998 |
| JP | 10-075287 | 3/1998 |
| JP | 2000-152060 | 5/2000 |
| JP | 2000-165718 | 6/2000 |
| JP | 2002-111835 | 4/2002 |
| JP | 2002-141990 | 5/2002 |
| JP | 2003-031968 | 1/2003 |
| JP | 2003-087376 | 3/2003 |
| JP | 2003-110680 | 4/2003 |
| JP | 2003-120652 | 4/2003 |
| WO | WO 97/08888 | 3/1997 |
| WO | WO03/030518 | 4/2003 |
| WO | WO03/046705 | 6/2003 |

OTHER PUBLICATIONS

Japanese Office Action (and English-language translation) dated May 9, 2008.
European Search Report dated Aug. 1, 2008.
Single page describing Kenwood's: Visual Communicator VC-H1; 2001, xp002483295; cited in European Search Report.
European Search Report Dated Feb. 14, 2005.
Chinese Search Report dated Jun. 30, 2006 (including European translation).
Kenwood Visual communicator VC-H1, pp. 1-2, Kenwood Corporation, 2001.
European Search Report dated Mar. 21, 2007.

* cited by examiner

PORTABLE TERMINAL HAVING DIGITAL CAMERA FUNCTION

The present application is a Continuation Application of U.S. patent application Ser. No. 11/016,739, filed Dec. 21, 2004, now U.S. Pat. No. 7,451,608 which claims priority from Korean Patent Application No. 97904/2003, filed Dec. 26, 2003, the subject matters of which are incorporated herein by reference.

BACKGROUND OF THE INVENTION

1. Field of the Invention

Embodiments of the present invention may relate to a portable terminal. More particularly, embodiments of the present invention may relate to a portable terminal having a digital camera function that allows the user to perform voice communication and to easily photograph a still image or dynamic image of a subject.

2. Background of Related Art

A portable terminal is a communication apparatus that a user may easily carry to perform voice transmission/reception. Due to rapid development of information and communication technologies, portable terminals may have a function of photographing a still image or dynamic image of a subject using a built-in camera, and transmitting or receiving the photographed image to/from another user as well as have functions relating to internet access and/or TV reception. The continuous development of the information and communication technologies may expand the application field of the portable terminal.

Figure 1:
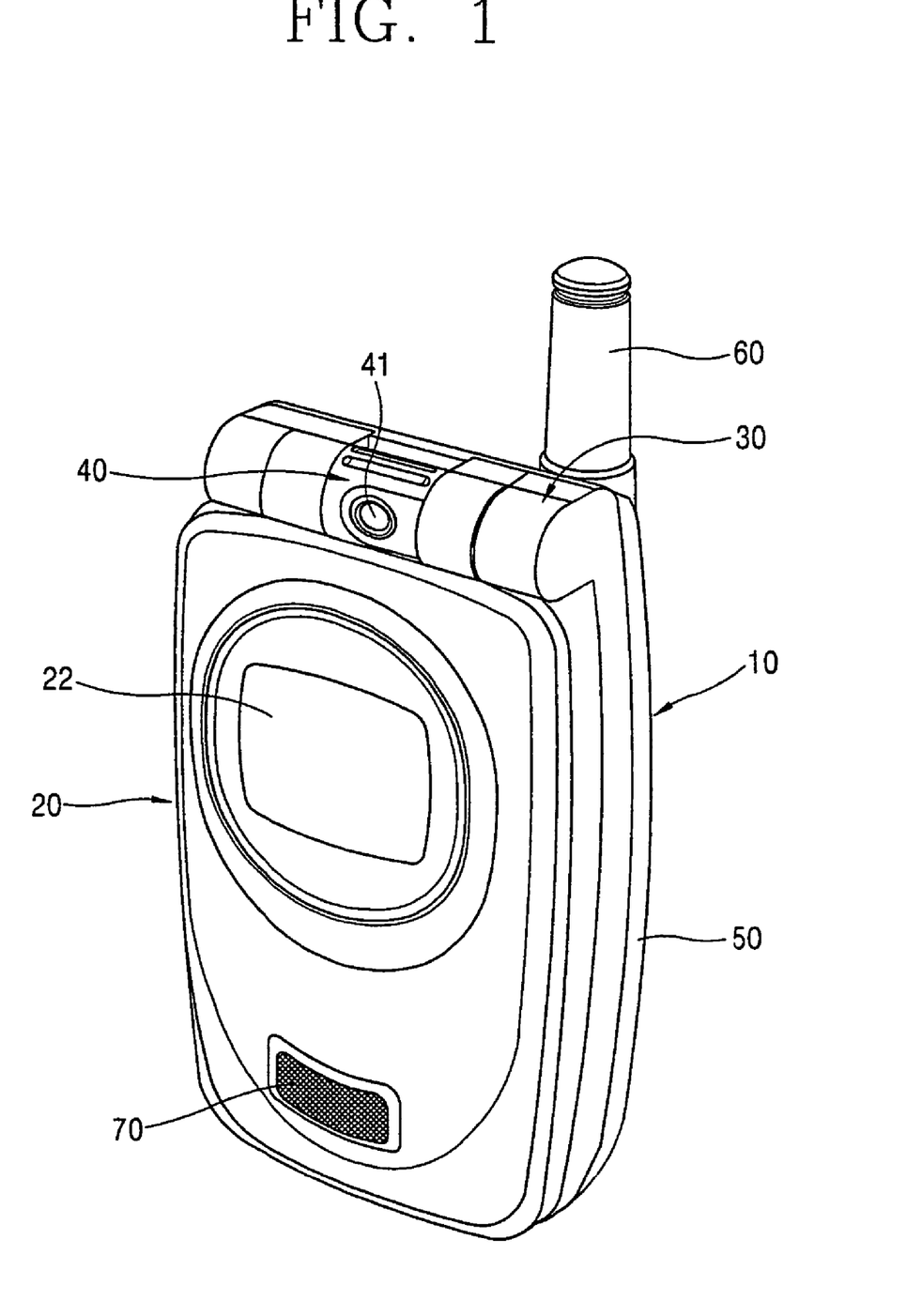
FIG. 1 is a perspective view illustrating a portable terminal having a camera according to an example arrangement.

FIG. 1 is a perspective view illustrating a portable terminal having a camera according to an example arrangement. Other arrangements are also possible. As shown in FIG. 1, a portable terminal having the camera may include a main body 10 for inputting information and controlling communication, a folder 20 having a display (not shown) for outputting the information as an image, a hinge coupling device 30 for rotatably coupling the folder 20 to the main body 10, a camera unit 40 rotatably coupled to the hinge coupling device 30, and a battery 50 detachably coupled to the rear surface of the main body 10. FIG. 1 also shows an antenna 60, a speaker 70, an auxiliary display 22, and a lens 41 of a camera module.

Figure 2:
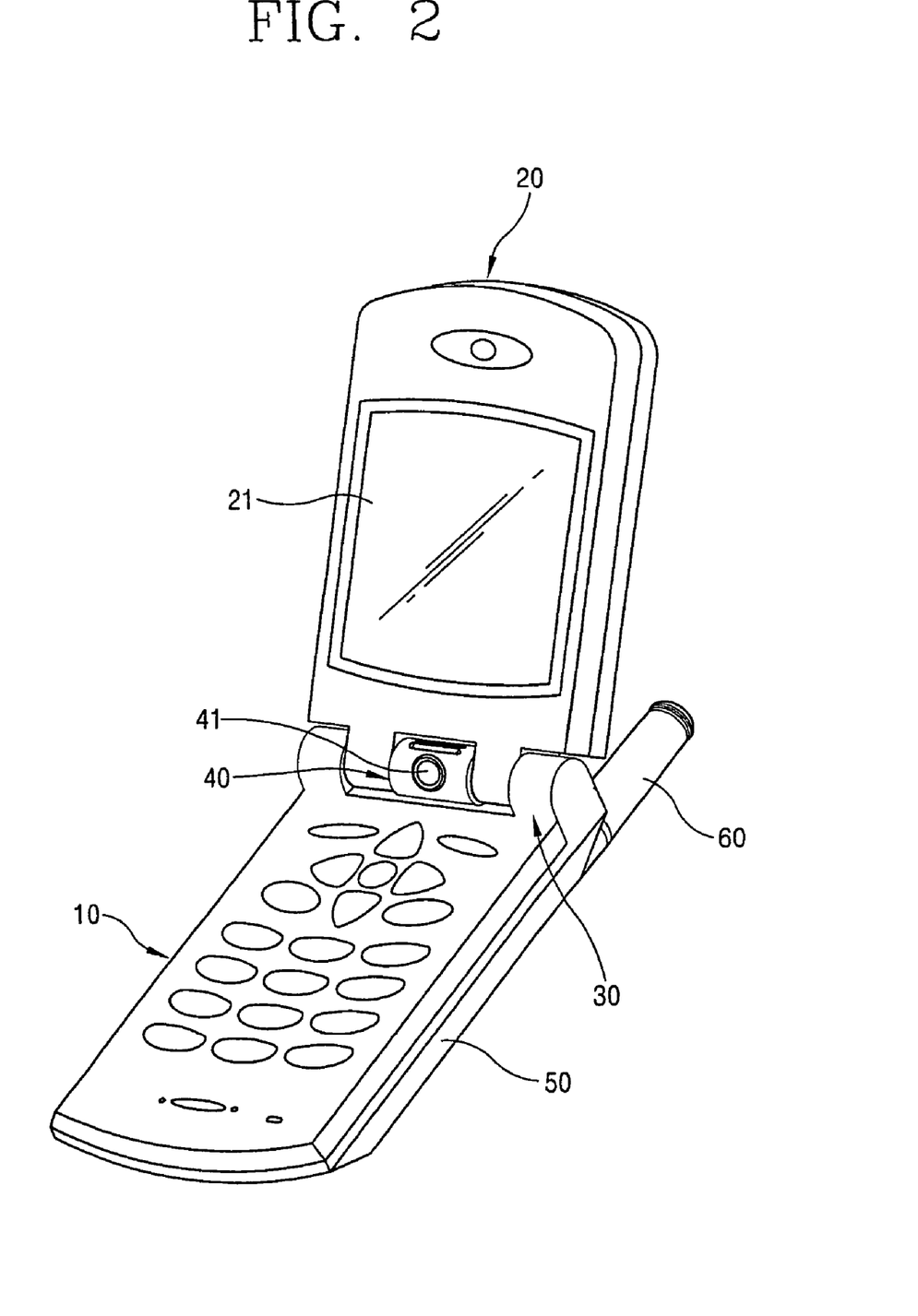
FIG. 2 is a perspective view illustrating a using state of the portable terminal having the camera according to an example arrangement.

Operation of the portable terminal having the camera will now be explained. When the user telephones another user or answers the phone, the user may open the folder 20 from the main body 10 as shown in FIG. 2. The folder 20 may be angularly rotated about an axis by using the hinge coupling device 30 as an axis. When the folder 20 is opened, the folder 20 may have a predetermined angle relative to the main body 10. The user may telephone another user or answer the phone in a state in which the user opens the folder 20 from the main body 10.

When the user photographs a still image or dynamic image of a subject by using the camera, the user may open the folder 20 from the main body 10 as shown in FIG. 2. When the subject is the user (i.e., when the user photographs himself/herself using the camera), the user may position the display 21 of the folder 20 and the lens 41 of the camera unit 40 in a same direction by rotating the camera unit 40. The user may adjust his/her image focused by the lens 41 and displayed on the display 21 by controlling the camera unit 40, and photograph himself/herself.

On the other hand, when the user photographs another subject, the user may position the lens 41 of the camera unit 40 and the display 21 of the folder 20 in opposite directions by rotating the camera unit 40. The user may watch an image of the subject focused by the lens 41 and displayed on the display 21 by controlling the camera unit 40 and photograph the subject. After photographing the subject, the user may close the folder 20 to return to the original position.

As described above, when the user photographs the still image or dynamic image of the subject using the camera unit 40, the user must open the folder 20 to photograph the subject. In addition, the user may adjust the image of the subject displayed on the display 21 by rotating the camera unit 40. That is, the portable terminal having the above-described camera may be disadvantageous in that the photographing process is complicated.

When the user photographs the subject, the folder 20 and the main body 10 may have a predetermined angle, and thus the display 21 for displaying the image of the subject may be inclined at a predetermined angle. Accordingly, the user cannot easily adjust the image of the subject to a desired composition. While the user is photographing the subject, if the main body 10 or the folder 20 gets an impact, it may be easily broken because the older 20 is angularly opened from the main body 10.

SUMMARY OF THE INVENTION

Embodiments of the present invention may solve at least the above problems and/or disadvantages and provide at least the advantages described hereinafter.

Embodiments of the present invention may provide a portable terminal having a digital camera function that allows the user to perform voice communication and/or easily photograph a still image or dynamic image of a subject.

Embodiments of the present invention may provide a portable terminal having a digital camera function that allows the user to photograph a subject and that improves the structural intensity in a photographing state to prevent damages based on an external impact.

Embodiments of the present invention may provide a portable terminal having a digital camera function. This may include a display main body, a camera assembly, a turning unit, a terminal main body, and a speaker/mike unit hereafter also called a speaker and a mike unit). The display main body may have a display. The camera assembly may have a camera module for focusing on a subject and photographing an image of the subject displayed on the display. The turning unit may rotatably couple the display main body to the camera assembly. The terminal main body may have an information processing function and may be movably mounted on the display main body. The speaker unit and the mike unit may transmit and/or receive voice information.

The foregoing and other objects, features, aspects and advantages of the present invention may become more apparent from the following detailed description when taken in conjunction with the accompanying drawings

BRIEF DESCRIPTION OF THE DRAWINGS

The accompanying drawings, which are included to provide a further understanding of the invention and are incorporated in and constitute a part of this specification, illustrate arrangements and embodiments of the present invention and together with the description serve to explain the principles of the invention.

The following represents brief descriptions of the drawings in which like reference numerals represent like elements and wherein.

DETAILED DESCRIPTION OF PREFERRED EMBODIMENTS

Figure 3:
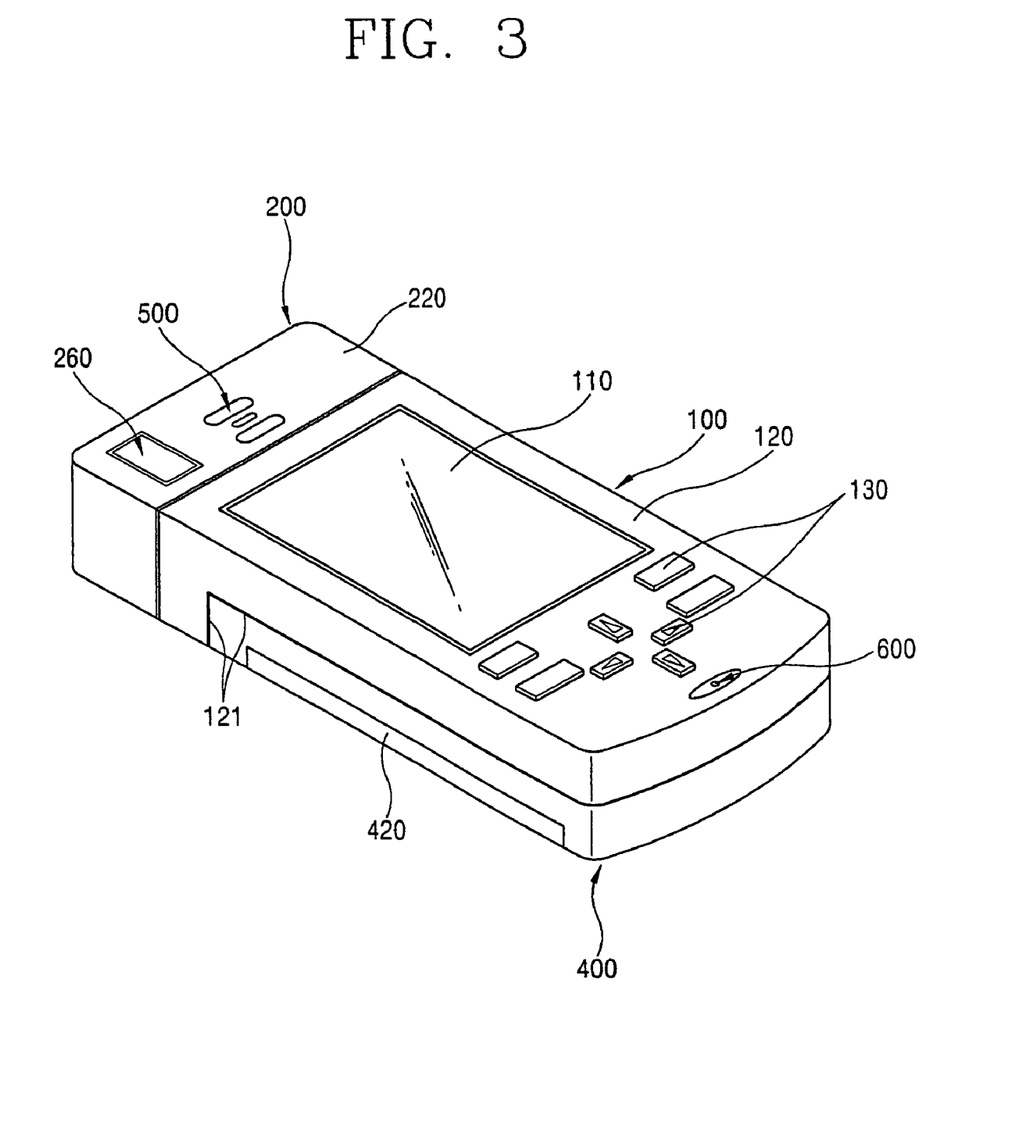
FIGS. 3 to 5 are perspective views illustrating a portable terminal having a digital camera function according to an example embodiment of the present invention.
Figure 4:
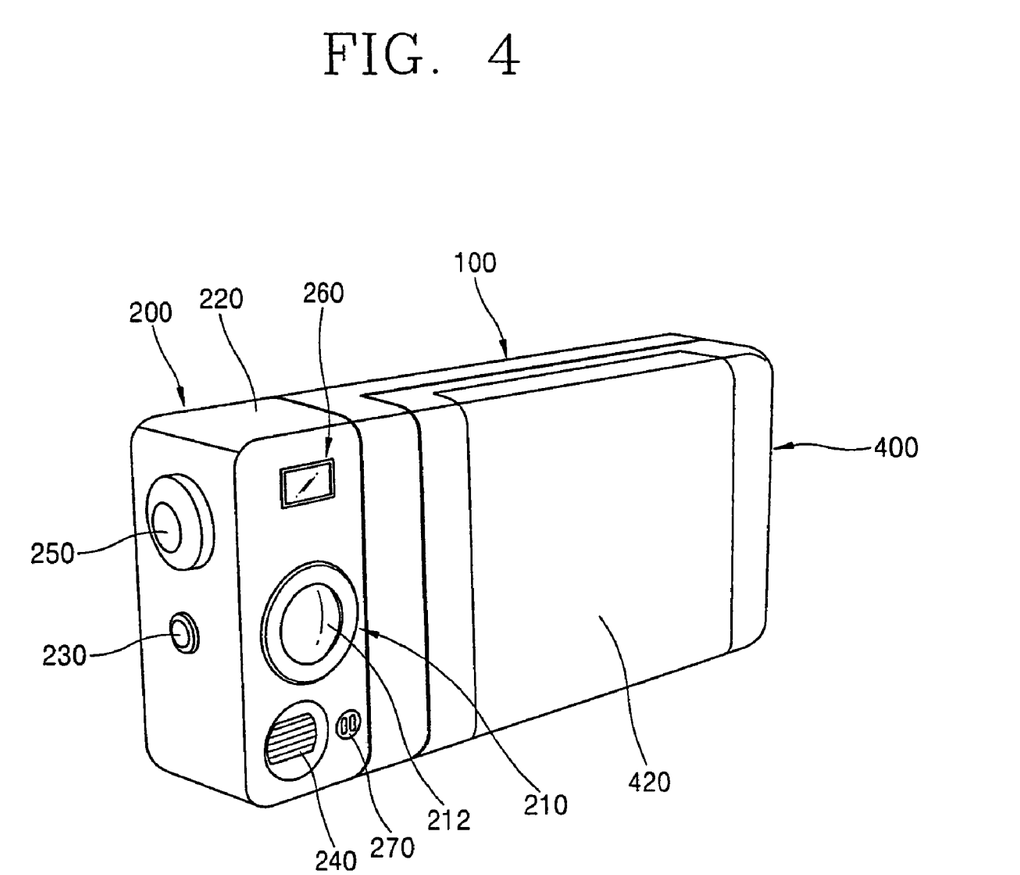
Figure 5:
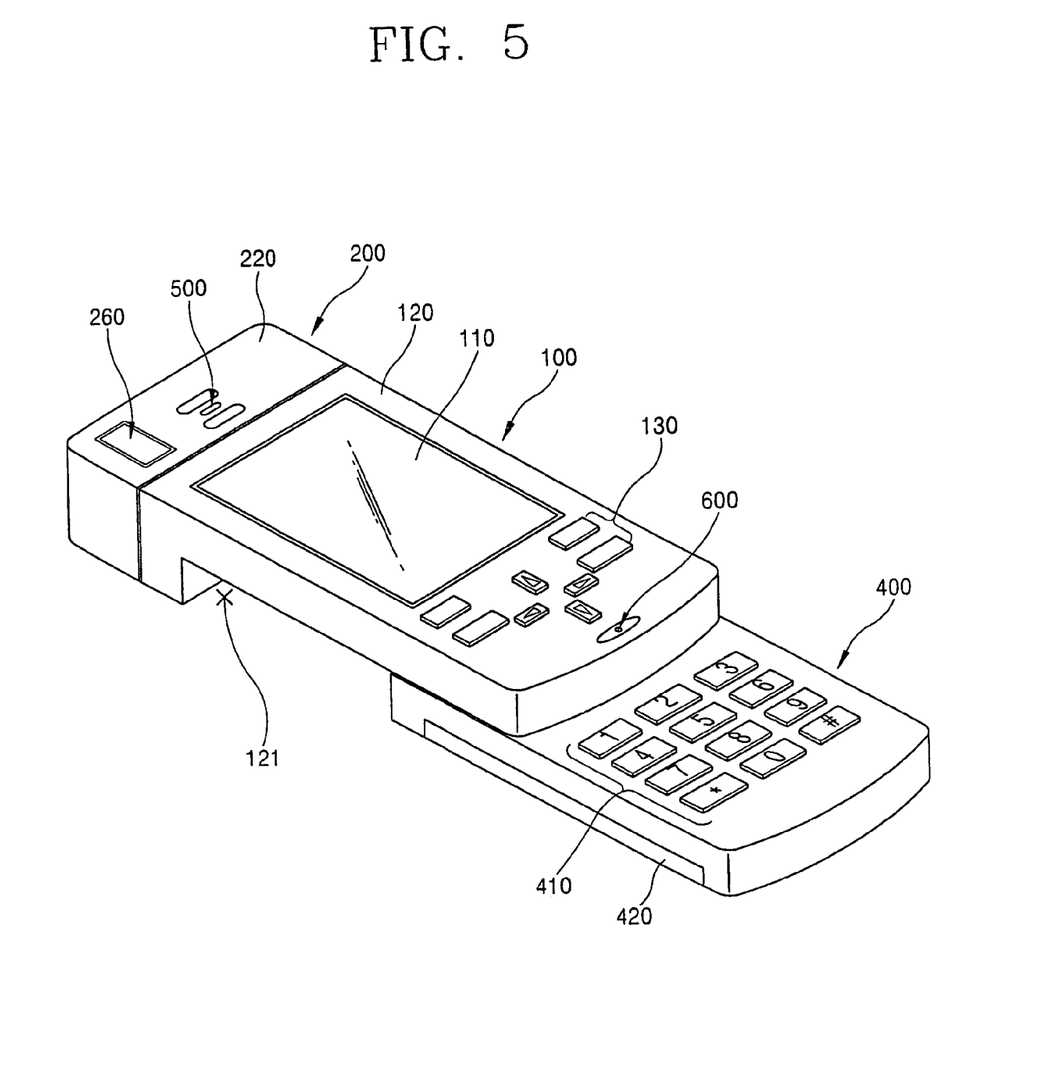

A portable terminal having a digital camera function in accordance with example embodiments of the present invention will now be described with reference to the accompanying drawings. FIGS. 3 to 5 are perspective views illustrating a portable terminal having a digital camera function according to an example embodiment of the present invention. Other embodiments and configurations are also within the scope of the present invention.

More specifically, and as shown in FIGS. 3 to 5, the portable terminal having the digital camera function may include a display main body 100, a camera assembly 200, a turning unit 300, a terminal main body 400, a speaker unit 500 and a mike unit 600. The display main body 100 may have a display 110. The camera assembly 200 may have a camera module 210 for focusing on a subject and photographing an image of the subject displayed on the display 110. The turning unit 300 may rotatably couple the display main body 100 to the camera assembly 200. The terminal main body 400 may have an information processing function and be movably mounted on the display main body 100. The speaker unit 500 and the mike unit 600 may transmit and/or receive voice information.

A sliding unit may move the terminal main body 400 in a lengthwise direction of the display main body 100. The sliding unit may be disposed in the terminal main body 400 and the display main body 100.

The display main body 100 may include a main body casing 120 having a mounting unit 121 on which the terminal main body 400 is slidably positioned at its one side, and having circuit components inside. The display 110 may be coupled to the main body casing 120. Control buttons 130 may be formed at one side of the main body casing 120 for controlling the camera module 210.

The main body casing 120 may be formed in a hexahedral shape having a predetermined width and length. The mounting unit 121 may be formed on one surface of the hexahedral shape. The mounting unit 121 is formed on one surface of the main body casing 120 to have a predetermined depth. The depth of the mounting unit 121 may correspond to the height (or depth) of the terminal main body 400, and the flat plate shape of the mounting unit 121 may correspond to the flat plate shape of the terminal main body 400.

The display 110 may be coupled to the main body casing 120 on an opposite side as the mounting unit 121. The display 110 may include a liquid crystal screen for displaying various image information for calls as well as an image (or images) of a subject for photographing.

The plurality of control buttons 130 may be formed on one surface of the main body casing 120. The control buttons 130 may be disposed next to the display 110. The control buttons 130 may have control functions for the camera module 210 such as zoom, photographing definition and shutter speed. On the other hand, the control buttons 130 may have a call start/end function, a power on/off function and a menu function as well as control functions for the camera module 210 in photographing.

The camera assembly 200 may include a camera casing 220 formed in a predetermined shape. The camera module 210 may mounted on the camera casing 220 and have a photographing button 230 mounted on the camera casing 220 and a flash 240 for lighting.

The camera casing 220 may be formed in a hexahedral shape. The width and height of the hexahedron may be identical (or substantially identical) to those of the display main body 100. One surface of the camera assembly 200 and one surface of the display main body 100 may be coupled to contact each other by way of the turning unit 300. One surface of the camera assembly 200 and one surface of the display main body 100 contacting each other may be formed in the same shape.

Figure 6:
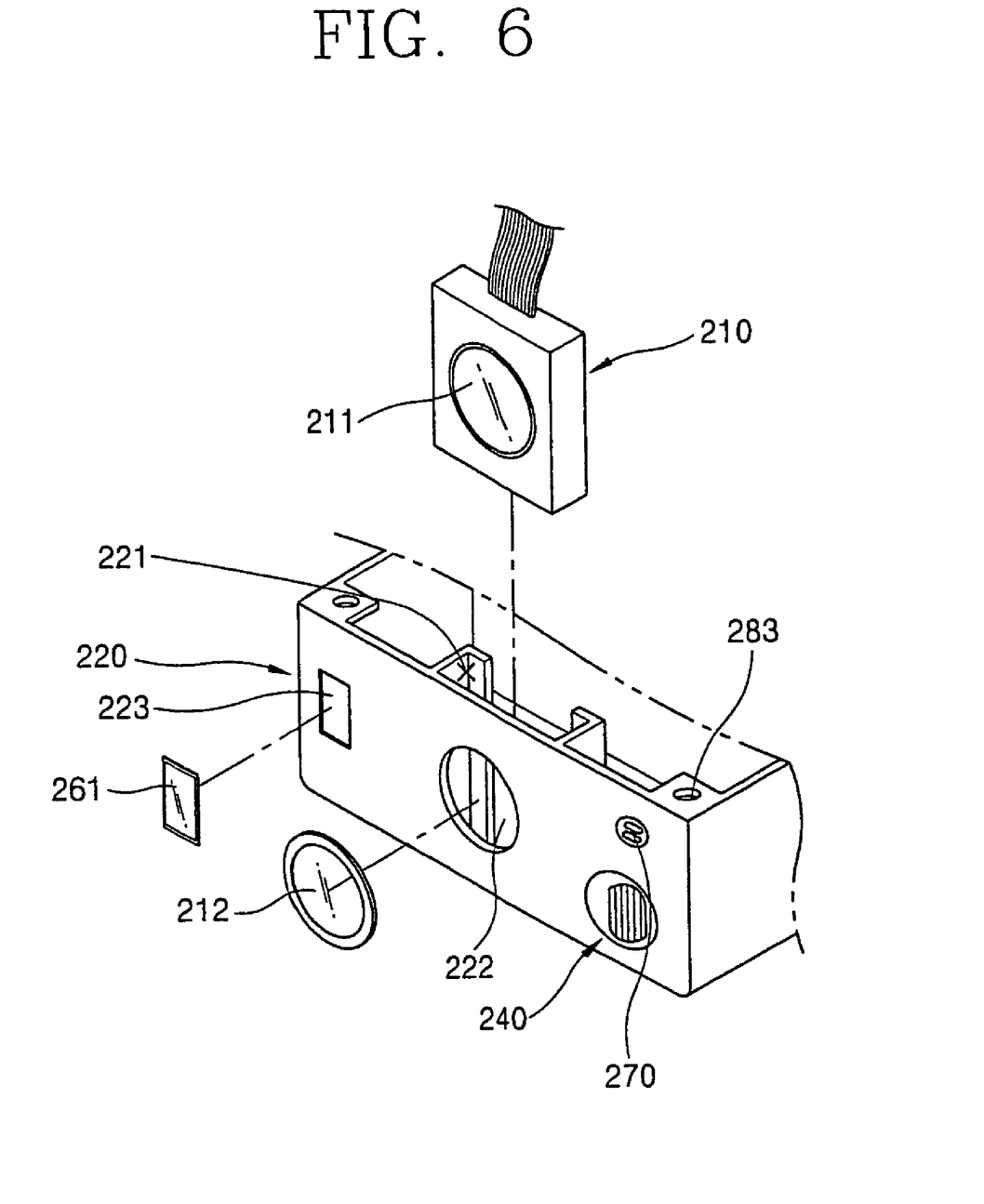
FIG. 6 is a disassembled perspective view illustrating a camera assembly of the portable terminal having the digital camera function according to an example embodiment of the present invention.

The camera module 210 may be mounted on one surface of the camera casing 220. The surface on which the camera module 210 is mounted may be vertical to the surface contacting the display main body 100. As shown in FIG. 6, a coupling groove 221 may be formed in the camera casing 220 in a predetermined shape and the camera module 210 may be inserted into the coupling groove 221. The shape of the coupling groove 221 may correspond to the shape of the camera module 210. A through hole 222 may be provided on which a lens 211 composing the camera module 210 is formed on the surface of the camera casing 220 positioned on a side of the coupling groove 221. A protecting lens 212 for protecting the lens 211 of the camera module 210 may be coupled to the through hole 222.

A mode select switch 250 may be formed on the camera assembly 200 for changing a photographing mode based on the photographing conditions. The mode select switch 250 may be mounted on one surface of the camera casing 220. The surface on which the mode select switch 250 is mounted may be an opposite surface as compared to the surface contacting the display main body 100. The mode select switch 250 may be a rotary type switch. The user may change the photographing mode into general photographing, clear day photographing, cloudy day photographing, night photographing, outdoor photographing, indoor photographing or close-up photographing, for example, by rotating (or otherwise operating) the mode select switch 250. An optimum shutter speed and an optimum exposure speed may be previously set for each of the photographing modes under specific conditions such as weather and brightness. Accordingly, the user may perform high quality photographing. The photographing button 230 may be positioned on the side of the mode select switch 250.

A direct perspective device 260 may be formed on the camera assembly 200 to allow the user to see a subject with a naked eye when he/she is not able to see the subject through the display 110 due to high illumination, for example. The direct perspective device 260 may include a passage 223 passing through the camera casing 220, and transparent lenses 261 mounted on the passage 223. The transparent lenses 261 may be fixedly coupled to both surfaces of the camera casing 220 composing the passage 223.

The flash 240 may be mounted on the camera casing 220 on the side of the camera module 210.

The camera assembly 200 may include an auxiliary mike unit 270 for inputting photographing-related voice when photographing. The auxiliary mike unit 270 may be positioned at the side of the flash 240.

Figure 7:
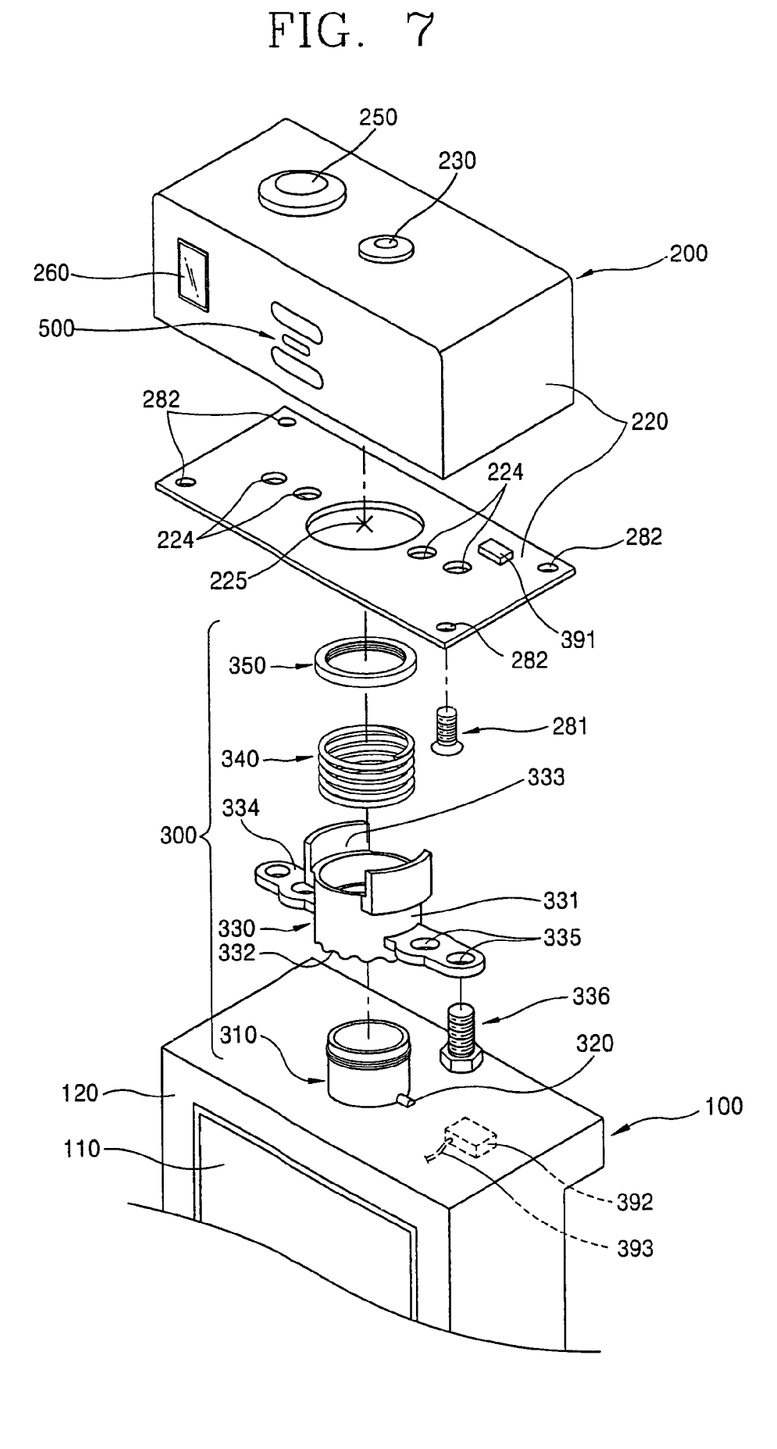
FIG. 7 is a disassembled perspective view illustrating a turning unit of a portable terminal having the digital camera function according to an example embodiment of the present invention.

As shown in FIG. 7, the turning unit 300 may include a cylindrical shaft 310, a fixing protrusion 320, a can holder 330, a can unit 332, a spring insertion unit 333, a spring 340 and a fixing member 350. The cylindrical shaft 310 may be formed in a cylindrical shape on the display main body 100. The fixing protrusion 320 may be formed at the side of the cylindrical shaft 310. The cam holder 330 may be rotatably inserted onto the cylindrical shaft 310 and fixedly coupled to the camera assembly 200. The cam unit 332 may be formed at one side end of a cylindrical unit 331 having a larger inside diameter than an outside diameter of the cylindrical shaft 310 and a predetermined length. The spring insertion unit 333 may be formed at the other side of the cylindrical unit 331. The spring 340 may be inserted into the spring insertion unit 333 of the cam holder 330. The fixing member 350 may be fixedly coupled to the cylindrical shaft 310 inserted into the cylindrical unit 331 of the cam holder 330 for fixedly supporting the spring 340.

The cylindrical shaft 310 may be formed on one surface of the main body casing 120 of the display main body 100 contacting the camera assembly 200. The cylindrical shaft 310 may be vertical to the surface. A through hole (not shown) corresponding to an inside diameter of the cylindrical shaft 310 may be formed on the surface of the main body casing 120 on which the cylindrical shaft 310 has been formed. Lines connecting the components of the camera assembly 200 to the components of the display main body 100 may be coupled through the through hole.

The fixing protrusion 320 may be formed on one surface of the main body casing 120 at the side of the cylindrical shaft 310.

The cam unit 332 of the cam holder 330 may be formed at the end of the cylindrical unit 331 in a waveform shape having a plurality of concave and convex parts. An angle of rotating the cam holder 330 may be dependent upon a number of the waveform shapes. When the number of the waveforms increases, the angle of rotating the cam holder 330 may decrease.

The fixing member 350 may be a nut. A thread to which the nut may be coupled may be formed on the outer circumferential surface of the cylindrical shaft 310. The outside diameter of the fixing member 250 may be equal to or larger than the outside diameter of the spring 340.

Coupling units 334 having a predetermined thickness and length may be formed at both sides of the outer circumferential surface of the cylindrical unit 331 of the cam holder 330, respectively, and through holes 335 may be formed on the coupling units 334. Screw holes 224 corresponding to the through holes 335 of the coupling units 334 may be formed on one surface of the camera assembly 200 contacting one surface of the display main body 100 (i.e., namely one surface of the camera casing 220 of the camera assembly 200). An insertion hole 225 into which the spring insertion unit 333 and the cylindrical unit 331 of the cam holder 330 are inserted may be formed between the screw holes 224.

The surface of the camera casing 220 contacting the display main body 100 may be separated as an individual plate. FIG. 7 further shows screws 281 and screw holes 282, 283.

The coupling operation of the turning unit 300 will now be explained. The cylindrical shaft 310 may be inserted into the cylindrical unit 331 of the cam holder 330. The spring 340 may be inserted into the spring insertion unit 333 of the cam holder 330 and the fixing member 350 may be fixedly coupled to the end of the cylindrical shaft 310 compressing the spring 340. The cam unit 332 of the cam holder 330 may adhere to one surface of the display main body 100 by elasticity of the spring 340 and may be engaged with the fixing protrusion 320. In a state where the spring insertion unit 333 and the cylindrical unit 331 of the cam holder 330 are inserted into the insertion hole 225 of the camera casing 220, the coupling units 334 of the cam holder 330 may be fixedly coupled to one surface of the camera casing 220 by a plurality of bolts 336.

The camera assembly 200 may be rotatably coupled to the display main body 100 by the turning unit 300. When the camera assembly 200 is rotated, the cam unit 332 of the cam holder 330 and the fixing protrusion 320 that form the turning unit 300 may adhere to each other by the spring 340, and the cam holder 330 may be rotated.

A sensing device may be provided for sensing rotation of the camera assembly 200. The sensing device may be formed on the camera assembly 200 and the display main body 100. The sensing device may include a magnet 391 mounted on the camera assembly 200, a sensor 392 mounted on one surface of the display main body 100 facing the magnet 391 for sensing a magnetic field of the magnet 391, and a signal line 393 for transmitting a signal sensed by the sensor 392.

As another example of the sensing device, a plurality of magnets 391 may be circularly arranged at predetermined intervals by using a rotation axis for a relative motion of the camera assembly 200 and the display main body 100 as a concentric axis.

When the camera assembly 200 is rotated, the sensor 392 of the sensing device may sense the magnetic field of the magnet 391 to detect a rotation number or angle of the camera assembly 200. Various signal input methods may be used according to rotation of the camera assembly 200, or operation signals for turning on/off power.

The speaker unit 500 may be installed on the camera assembly 200. More specifically, the speaker unit 500 may be installed on one surface of the camera casing 220 on the opposite side to the camera module 210.

The mike unit 600 may be installed on the display main body 100. More specifically, the mike unit 600 may be installed on the main body casing 120 at sides of the control buttons 130. When the user talks over the phone, the speaker unit 500 installed on the camera assembly 200 and the mike unit 600 installed on the display main body 100 are positioned on the same surface.

The terminal main body 400 may be formed in a hexahedral shape having a predetermined thickness.

A keypad 410 for inputting information may be disposed on one surface of the terminal main body 400 and a battery 420 may be detachably mounted on the opposite surface thereof.

Figure 8:
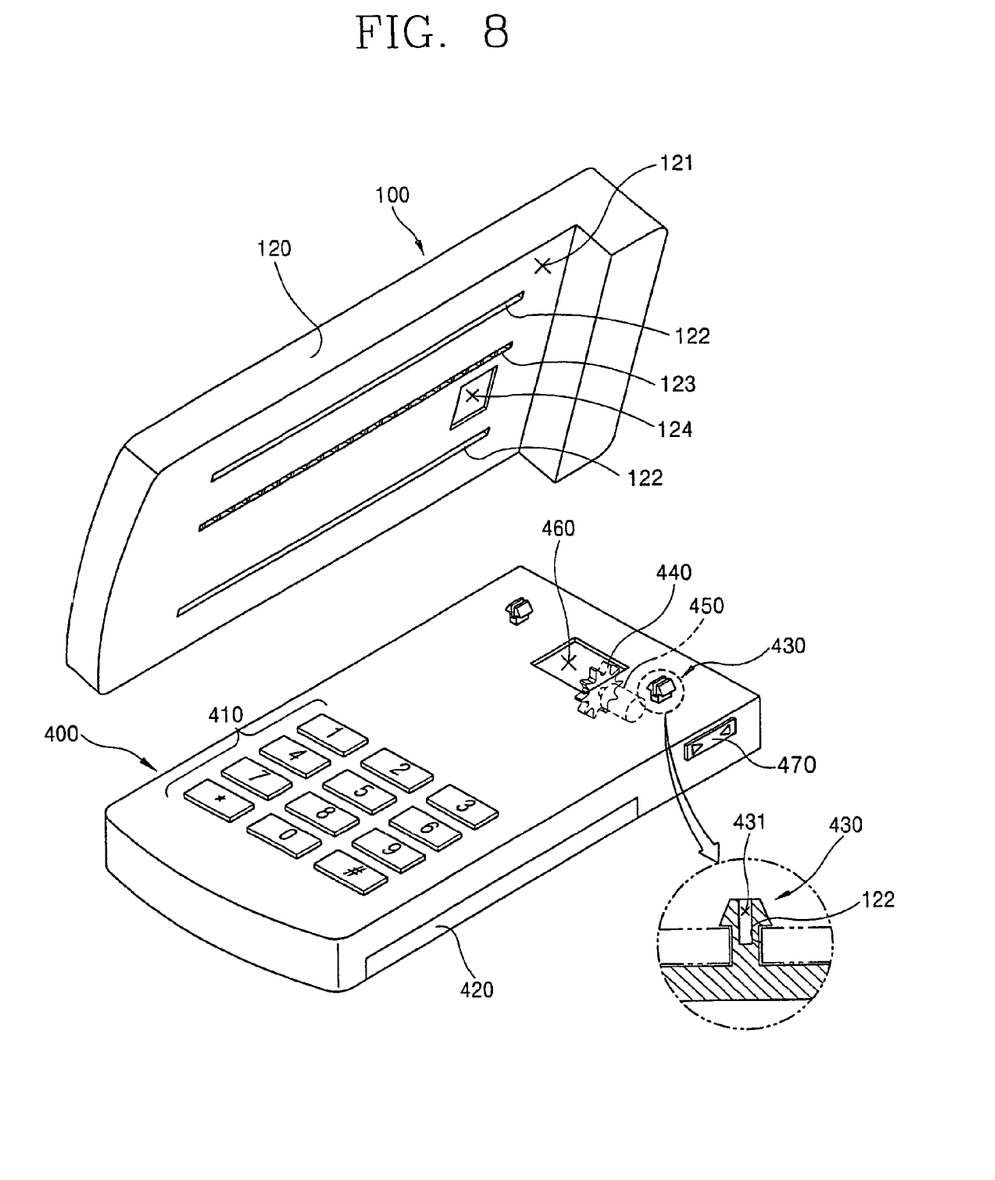
FIG. 8 is a disassembled perspective view illustrating a sliding unit of a portable terminal having the digital camera function according to an example embodiment of the present invention.

In FIG. 8, the sliding unit may include guide grooves 122 formed with a predetermined width and length on the mounting surface of the display main body 100 on which the terminal main body 400 is mounted. A rack 123 may be formed on the mounting surface in parallel to the guide grooves 122. Guide protrusions 430 may protrude from one surface of the terminal main body 400 facing the mounting surface of the display main body 100, and may be slidably inserted into the guide grooves 122. A pinion 440 may be mounted on the terminal main body 400 and engaged with the rack 123. A driving motor 450 may rotate the pinion 440.

The two guide grooves 122 may be formed in a length direction of the display main body 100 at predetermined intervals. The guide protrusions 430 may be press-fit into the guide grooves 122 and formed in a hook shape having a slit groove 431 to be separated from the guide grooves 122. The number of the guide protrusions 430 may correspond to the number of the guide grooves 122. That is, when two guide grooves 122 are formed, two guide protrusions 430 may be formed.

The rack 123 may be formed in a length direction of the terminal main body 400 and may be positioned between the two guide grooves 122.

A through hole 124 having a predetermined area may be formed on the mounting surface (i.e., one surface of the mounting unit 121 of the display main body 100). A through hole 460 corresponding to the through hole 124 may be formed on one surface of the terminal main body 400 facing the mounting surface of the display main body 100. The signal lines connecting the components of the display main body 100 to the components of the terminal main body 400 may be coupled through the through hole 124 of the display main body 100 and the through hole 460 of the terminal main body 400.

The pinion 440 may be positioned inside the through hole 460 of the display main body 100, and may be externally protruded to be engaged with the rack 123 when the terminal main body 400 and the display main body 100 are coupled. The driving motor 450 may be mounted inside the terminal main body 400.

In the sliding unit, when the driving motor 450 is rotated in a forward or backward direction, the pinion 440 coupled to the driving motor 450 may be rotated in a forward or backward direction. When the pinion 440 is rotated in the forward or backward direction, the rack 123 engaged with the pinion 440 may perform a linear motion in one direction or in an opposite direction. As the rack moves 123, the terminal main body 400 and the display main body 100 perform a relative motion so that the terminal main body 400 can slide to/from the mounting unit 121 of the display main body 100. The terminal main body 400 may perform a linear motion within a limited distance based on the guide grooves 122 and the guide protrusions 430.

According to another example of the coupling structure of the display main body 100 and the terminal main body 400, the terminal main body 400 may be hinge-coupled to one side of the display main body 100 by a hinge device.

An open/close switch 470 may be provided for operating the driving motor 450. Operational effects of the portable terminal having a digital camera function in accordance with an example embodiment of the present invention will now be described. The user may answer the phone by pressing one of the control buttons 130 and phone another user by pulling the terminal main body 400 from the display main body 100 by the sliding unit and using the keypad 410 and the control buttons 130 of the terminal main body 400. When the user answers the phone or phones another user, the speaker unit 500, the display 110 and the mike unit 600 are positioned on the same surface. The display 110 may display image information.

When the user presses the open/close switch 470, the terminal main body 400 may slide to/from the mounting unit 121 of the display main body 100 by the sliding unit.

Figure 9:
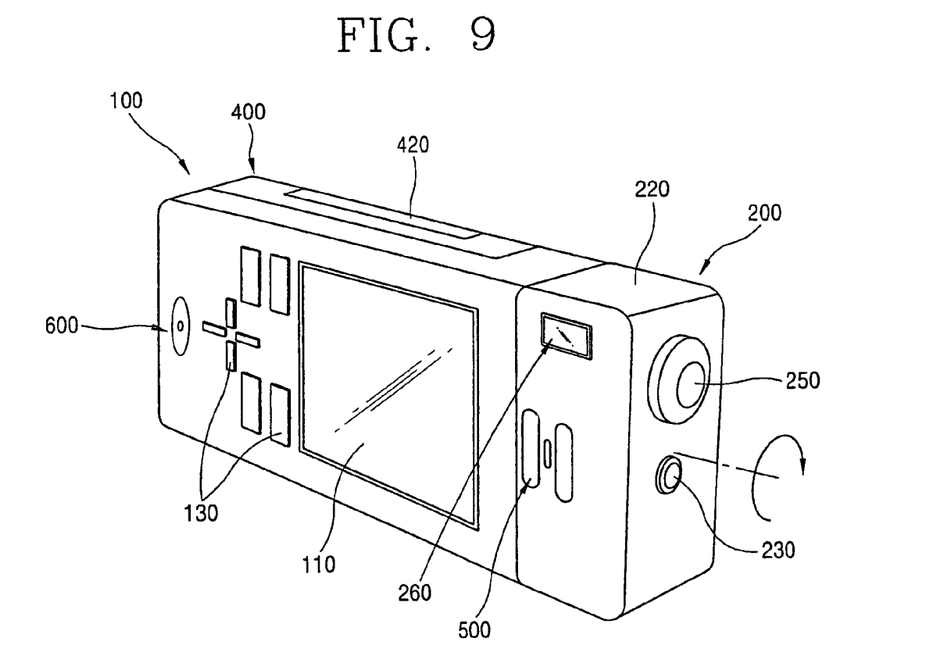
FIGS. 9 and 10 are perspective views illustrating a using state of the portable terminal having the digital camera function according to an example embodiment of the present invention.

On the other hand, when the user photographs a subject as shown in FIG. 9, the user may position the camera module 210 and the display 110 in the opposite directions by rotating the camera assembly 200. The camera module 210 may be rotated by the turning unit 300. In this state, the user may see an image of the subject focused by the camera module 210 and displayed on the display 110, and photograph the wanted image of the subject. Here, the camera module 210 and the display 110 may be positioned at different angles such as at an angle of 180° with respect to each other.

When the user photographs a subject in a lighted place, the user may not clearly distinguish the image of the subject displayed on the display 110. Accordingly, the user may photograph the subject seeing the subject with the naked eye through the direct perspective device 260.

Figure 10:
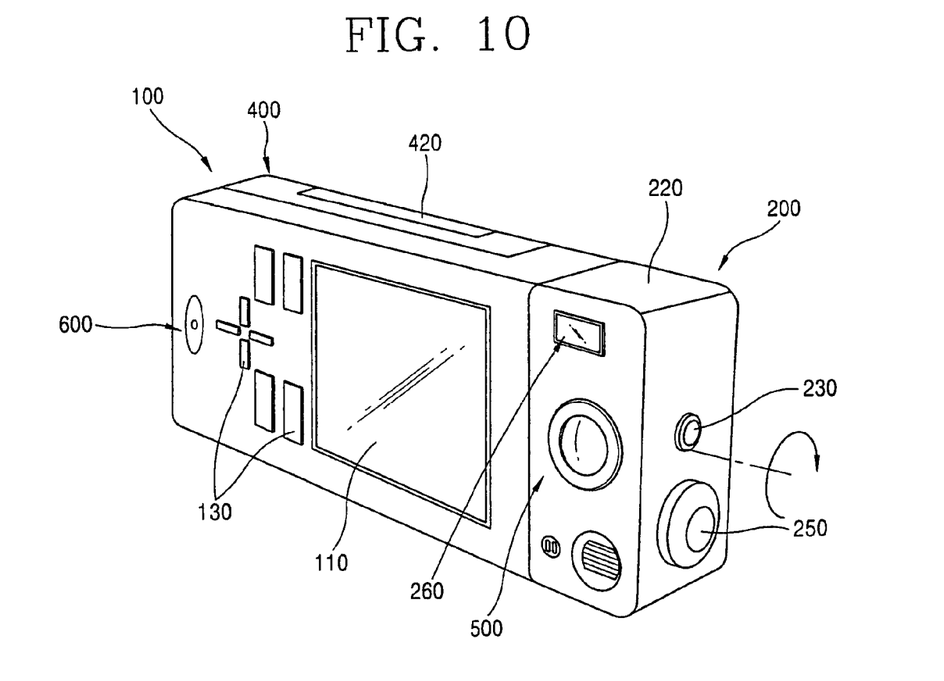

When the user photographs himself/herself, as shown in FIG. 10, the user may position the camera module 210 and the display 110 in the same direction by rotating the camera assembly 200. The user may see his/her image focused by the camera module 210 and displayed on the display 110, and photograph the wanted image.

The user may photograph a still image or dynamic images of the subject or the user himself/herself when the terminal main body 400 slides to/from the mounting unit 121 of the display main body 100.

In embodiments of the present invention, the portable terminal having the digital camera function may allow the user to perform voice communication and photograph the subject or the user himself/herself by rotating the camera assembly 200 or the display main body 100. Therefore, the photographing process may be simplified. Conversely, the portable terminal may not be convenient since the user may have to open the folder 20 to photograph the subject or the user himself/herself.

In addition, when the user is not able to clearly see the subject through the display 110 in a lighted place, the user may easily photograph the subject seeing the subject with the naked eye.

Furthermore, the display main body 100 and the camera assembly 200 may be arranged in a straight line to improve the structural intensity. The portable terminal having the digital camera function may allow the user to perform voice communication and to easily photograph still images or dynamic images resulting in the user's satisfaction.

When the user photographs still images or dynamic images, the portable terminal having the digital camera function shows high structural intensity in the photographing state to prevent damages by an external impact and improve reliability. As a result, the portable terminal allows the user to freely photograph still images or dynamic images with high satisfaction.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A portable terminal having a digital camera function, comprising:
   a display body having a display;
   a camera assembly having a camera module, and arranged to rotate about a rotational axis perpendicular to a widthwise direction of the display body;
   a turning unit coupled to the display body to allow the camera assembly to rotate about the rotational axis;
   a main body;

a mechanism to couple the main body and the display body to each other; and a rotation-stopping unit configured to stop the camera assembly being rotated with respect to the display body at one or more positions between a starting position and an ending position, wherein at least one function associated with the portable terminal is performed when the camera assembly being rotated has a changed position from one to another one of the positions with the display being outwardly exposed regardless of the rotation of the camera assembly, wherein the camera assembly is disposed to protrude from an end portion of the display body and has the same width as the display body in the widthwise direction and the camera assembly being flush with the end portion, and a length of the camera assembly in a longitudinal direction of the display body is shorter than a length of the display in a same direction, wherein a total thickness of the display body and the main body is the same as a thickness of the camera assembly when the portable terminal is in a closed state.

2. The portable terminal of claim 1, wherein the camera assembly includes at least one key.

3. The portable terminal of claim 2, wherein the at least one key comprises a key related to operation of the camera module.

4. The portable terminal of claim 1, wherein the camera assembly protrudes from one end of the display body.

5. The portable terminal of claim 1, wherein the camera assembly includes a camera module lens on a first surface of the camera assembly and at least one key on a second surface of the camera assembly.

6. The portable terminal of claim 1, wherein the display body includes a key.

7. The portable terminal of claim 1, wherein the display body includes a first surface having the display and at least one key.

8. The portable terminal of claim 1, wherein the display body includes one or more keys configured to control operations of the camera assembly.

9. The portable terminal of claim 1, wherein the at least one function includes turning on/off power of the camera assembly or the portable terminal.

10. The portable terminal of claim 1, wherein the mechanism allows sliding of the main body relative to the display body.

11. The portable terminal of claim 1, further comprising a speaker and a mike to receive and output voice information so as to allow a user to perform voice communication.

12. The portable terminal of claim 11, wherein the camera assembly includes the speaker.

13. The portable terminal of claim 11, wherein the main body is movably coupled to the display body, wherein the main body includes the mike.

14. The portable terminal of claim 1, wherein the main body or the display body is configured to move in a first direction and the camera assembly is configured to move in a second direction different than the first direction.

15. The portable terminal of claim 1, wherein the display body is separate from the main body.

16. The portable terminal of claim 1, further comprising a sensing device to sense the rotation of the camera assembly.

17. The portable telephone of claim 16, wherein the sensing device includes a magnet, a sensor and a signal line, the sensor to sense a magnetic field of the magnet, and the signal line to transmit a signal sensed by the sensor.

18. The portable terminal of claim 1, wherein the camera assembly includes a mike that is operatively associated with image capturing by the camera module.

19. The portable terminal of claim 1, wherein a thickness of the display body at the end portion of the display body is equal to a thickness of the camera assembly.

20. A portable terminal having a digital camera function, comprising:

a display body having a display and at least one key;

a camera having a camera, and coupled to the display body so as to rotate about a rotational axis perpendicular to a widthwise direction of the display body;

a main body movably coupled to the display body, wherein the main body includes a plurality of keys on a surface; and a rotation-stopping unit configured to stop the camera body being rotated with respect to the display body at one or more positions between a starting position and an ending position, wherein at least one function associated with the portable terminal is performed when the camera body being rotated has a changed position from one to another one of the positions with the display being outwardly exposed regardless of the rotation of the camera body, wherein the camera body is disposed to protrude from an end portion of the display body and has a same width as the display body in the widthwise direction and the camera body being flush with the end portion, and a length of the camera body in a longitudinal direction of the display body is shorter than a length of the display in a same direction, wherein a total thickness of the display body and the main body is the same as a thickness of the camera body when the portable terminal is in a closed state.

21. The portable terminal of claim 20, wherein the camera body includes at least one key.

22. The portal terminal of claim 21, wherein the at least one key comprises a key related to operation of the camera.

23. The portable terminal of claim 20, wherein the camera body includes a camera module lens on a first surface of the camera body and at least one key on a second surface of the camera body.

24. The portable terminal of claim 20, wherein the display is activated if the rotation of the camera body is performed.

25. The portable terminal of claim 20, wherein the display body includes a first surface having the display and the at least one key.

26. The portable terminal of claim 20, wherein the camera body includes a speaker.

27. The portable terminal of claim 20, further comprising a speaker and a mike to receive and output voice information so as to allow a user to perform voice communication.

28. The portable terminal of claim 20, further comprising a sensing device to sense rotation of the camera body relative to the display body or to sense rotation of the display body relative to the camera body.

29. The portable telephone of claim 28, wherein the sensing device includes a magnet, a sensor and a signal line, the sensor to sense a magnetic field of the magnet, and the signal line to transmit a signal sensed by the sensor.

30. The portable terminal of claim 20, wherein the camera body includes a mike that is operatively associated with image capturing by the camera.

31. The portable terminal of claim 20, wherein a thickness of the display body at the end portion of the display body is equal to a thickness of the camera body.

32. A portable terminal having a digital camera function, comprising:
- a display body having a display and at least one control key on a same surface;
- a camera assembly housing having a camera and at least one key, and coupled to the display body so as to rotate about a rotational axis perpendicular to a widthwise direction of the display body;
- a main body;
- a turning unit having a shaft to couple the display body to the camera assembly housing, the turning unit to rotatably couple the display body to the camera assembly housing; and
- a rotation-stopping unit configured to stop the camera assembly housing being rotated with respect to the display body at one or more positions between a starting position and an ending position,
- wherein at least one function associated with the portable terminal is performed when the camera assembly housing being rotated has a changed position from one to another one of the positions with the display being outwardly exposed regardless of the rotation of the camera assembly housing,
- wherein the camera assembly housing is disposed to protrude from an end portion of the display body and having a same width as the display body in the widthwise direction and the camera assembly housing being flush with the end portion, and a length of the camera assembly housing in a longitudinal direction of the display body is shorter than a length of the display in a same direction, wherein a total thickness of the display body and the main body is the same as a thickness of the camera assembly housing when the portable terminal is in a closed state.

33. The portable terminal of claim 32, wherein the display is activated if the rotation of the camera assembly housing is performed.

34. The portable terminal of claim 32, wherein the at least one key or the at least one control key relates to operation of the camera.

35. The portable terminal of claim 32, wherein the camera assembly housing includes a camera module lens on a first surface of the camera assembly housing and the at least one key is on a second surface of the camera assembly housing.

36. The portable terminal of claim 32, wherein the camera assembly housing includes a speaker.

37. The portable terminal of claim 32, further comprising a speaker and a mike to receive and output voice information so as to allow a user to perform voice communication.

38. The portable terminal of claim 32, further comprising a sensing device to sense the rotation of the camera assembly housing relative to the display body.

39. The portable telephone of claim 38, wherein the sensing device includes a magnet, a sensor and a signal line, the sensor to sense a magnetic field of the magnet, and the signal line to transmit a signal sensed by the sensor.

40. The portable terminal of claim 32, wherein the camera assembly housing includes a mike that is operatively associated with image capturing by the camera.

41. The portable terminal of claim 32, wherein a thickness of the display body at the end portion of the display body is equal to a thickness of the camera assembly housing.

42. A portable terminal having a digital camera function, the portable terminal comprising:
- a display body having a display;
- a camera assembly having a camera module;
- a turning unit coupled to the display body to allow the camera assembly to rotate about a display body; and
- a main body movably connected to the display body allowing the portable terminal to be in a closed state or an opened state according to a relative motion,
- wherein the camera assembly is disposed to protrude from an end portion of the display body and the camera assembly being flush with the end portion, and a length of the camera assembly in a longitudinal direction of the display body is shorter than a length of the display in a same direction,
- wherein a total thickness of the display body and the main body is the same as a thickness of the camera assembly when the portable terminal is in a closed state.

43. The portable terminal of claim 42, wherein the camera assembly has a same width as the display body in the widthwise direction.

44. The portable terminal of claim 42, further comprising a rotation-stopping unit configured to stop the camera assembly being rotate with respect to the display body at one or more positions between a starting position and an ending position.

45. The portable terminal of claim 42, wherein at least one function associated with the portable terminal is performed when the camera assembly being rotated has a changed position from one to another one of the positions with the display being outwardly exposed regardless of the rotation of the camera assembly.

* * * * *

UNITED STATES PATENT AND TRADEMARK OFFICE
CERTIFICATE OF CORRECTION

PATENT NO.        : 7,742,100 B2                    Page 1 of 1
APPLICATION NO.   : 11/640333
DATED             : June 22, 2010
INVENTOR(S)       : Young-Hoon Yoo et al.

It is certified that error appears in the above-identified patent and that said Letters Patent is hereby corrected as shown below:

On the Title Page

<u>Item (30)    Foreign Application Priority Data</u> should read

<u>Dec. 26, 2003    (KR)    10-2003-0097904</u>

Signed and Sealed this

Twenty-fourth Day of August, 2010

David J. Kappos
*Director of the United States Patent and Trademark Office*